US012628204B2

(12) United States Patent
Lee et al.

(10) Patent No.: US 12,628,204 B2
(45) Date of Patent: May 12, 2026

(54) SIGNAL TRANSMISSION/RECEPTION METHOD FOR WIRELESS COMMUNICATION, AND APPARATUS THEREFOR

(71) Applicant: LG ELECTRONICS INC., Seoul (KR)

(72) Inventors: Youngdae Lee, Seoul (KR); Jaehyung Kim, Seoul (KR); Suckchel Yang, Seoul (KR); Seonwook Kim, Seoul (KR); Seunggye Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/953,841

(22) Filed: Sep. 27, 2022

(65) Prior Publication Data

US 2023/0027824 A1     Jan. 26, 2023

Related U.S. Application Data

(63) Continuation of application No. PCT/KR2021/006135, filed on May 17, 2021.

(30) Foreign Application Priority Data

May 15, 2020     (KR) ........................ 10-2020-0058683

(51) Int. Cl.
*H04W 74/0833* (2024.01)
*H04W 74/0836* (2024.01)
*H04W 74/0838* (2024.01)
(52) U.S. Cl.
CPC .... *H04W 74/0833* (2013.01); *H04W 74/0836* (2024.01); *H04W 74/0838* (2024.01)

(58) Field of Classification Search
CPC .......................... H04W 74/0833; H04W 24/08
See application file for complete search history.

(56) References Cited

U.S. PATENT DOCUMENTS

2019/0124646 A1* 4/2019 Ly .......................... H04W 72/21
2019/0208548 A1* 7/2019 Shih .................... H04W 74/004
(Continued)

FOREIGN PATENT DOCUMENTS

CN          104488346          4/2015
CN          109391439          2/2019
(Continued)

OTHER PUBLICATIONS

3rd Generation Partnership Project (3GPP), "Technical Specification Group Radio Access Network; NR; Radio Resource Control (RRC) protocol specification (Release 16)," 3GPP TS 38.331 V16.0.0, Apr. 2020, 836 pages.
(Continued)

*Primary Examiner* — Chuong M Nguyen
(74) *Attorney, Agent, or Firm* — LEE, HONG, DEGERMAN, KANG & WAIMEY

(57)     ABSTRACT

According to one embodiment of the present invention, a terminal can acquire an RACH configuration for at least one from among a plurality of UL BWPs, select an initial UL BWP from among the plurality of UL BWPs, and transmit a random access preamble on the basis of the RACH configuration on the selected initial UL BWP, the plurality of UL BWPs can include: a first UL BWP related to only a first type terminal of which the capability is reduced to support a bandwidth that is less than a predetermined bandwidth; and a second UL BWP related to a second type terminal that is different from the first type terminal, and the terminal, as the first type terminal, can be configured to select the first (Continued)

UL BWP or the second UL BWP as the initial UL BWP according to whether a predetermined condition is satisfied.

7 Claims, 11 Drawing Sheets

(56)                    References Cited

U.S. PATENT DOCUMENTS

| 2019/0357262 | A1* | 11/2019 | Cirik | H04W 24/08 |
|---|---|---|---|---|
| 2020/0145169 | A1* | 5/2020 | Zhou | H04W 72/20 |
| 2020/0288507 | A1* | 9/2020 | Chang | H04W 74/0833 |
| 2021/0058971 | A1* | 2/2021 | MolavianJazi | H04W 72/23 |
| 2021/0329718 | A1* | 10/2021 | Hu | H04W 72/23 |
| 2023/0038753 | A1* | 2/2023 | Tan | H04W 36/0033 |

FOREIGN PATENT DOCUMENTS

| CN | 109391935 | | 2/2019 | |
|---|---|---|---|---|
| CN | 109891994 | | 6/2019 | |
| CN | 110495241 | | 11/2019 | |
| CN | 110611954 | | 12/2019 | |
| CN | 110611955 | | 12/2019 | |
| CN | 110830200 | | 2/2020 | |
| CN | 110831237 | | 2/2020 | |
| CN | 110932833 | | 3/2020 | |
| CN | 111034304 | | 4/2020 | |
| EP | 3506713 | | 7/2019 | |
| EP | 3506713 | A1* | 7/2019 | H04L 5/0051 |
| KR | 1020200040900 | | 4/2020 | |
| KR | 10-2020-0051052 | | 5/2020 | |
| WO | 2019096150 | | 5/2019 | |
| WO | 2020009144 | | 7/2021 | |

OTHER PUBLICATIONS

PCT International Application No. PCT/KR2021/006135, Written Opinion of the International Searching Authority dated Sep. 3, 2021, 3 pages.

The State Intellectual Property Office of the People's Republic of China Application Serial No. 202180030116.8, Office Action dated Aug. 28, 2024, 6 pages.

Korean Intellectual Property Office Application No. 10-2022-7029035, Office Action dated Dec. 17, 2024, 11 pages.

Lenovo, Motorola Mobility, "On UE complexity reduction features", R1-2003828, 3GPP TSG RAN WG1 Meeting #101, May 2020, 4 pages.

The State Intellectual Property Office of the People's Republic of China Application Serial No. 202180030116.8, Office Action dated Mar. 11, 2025, 9 pages.

The State Intellectual Property Office of the People's Republic of China Application Serial No. 202180030116.8, Office Action dated Aug. 29, 2025, 5 pages.

Korean Intellectual Property Office Application No. 10-2022-7029035, Office Action dated Aug. 30, 2025, 7 pages.

Qualcomm Incorporated, "Remaining control plane issues of BWP", R2-1713885, 3GPP TSG-RAN WG2 Meeting #100, Dec. 2017, 7 pages.

Nokia Networks, "M-SIB1 analysis for Low cost MTC", R2-151141, 3GPP TSG-RAN WG2 Meeting #89bis, Apr. 2015, 9 pages.

* cited by examiner (a)

SIGNAL TRANSMISSION/RECEPTION METHOD FOR WIRELESS COMMUNICATION, AND APPARATUS THEREFOR

CROSS-REFERENCE TO RELATED APPLICATION(S)

This application is a continuation of International Application No. PCT/KR2021/006135, filed on May 17, 2021, which claims the benefit of earlier filing date and right of priority to Korean Patent Application No. 10-2020-0058683, filed on May 15, 2020, the contents of all of which are hereby incorporated by reference herein in their entireties.

TECHNICAL FIELD

The present disclosure relates to wireless communication, and more particularly, to a method of transmitting or receiving an uplink/downlink signal in a wireless communication system and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

The object of the present disclosure is to provide a method of transmitting and receiving signals more efficiently in a wireless communication system where different types of user equipments (UEs) operate.

The objects of present disclosure are not limited to what has been particularly described hereinabove, and other objects that the present disclosure could achieve will be more clearly understood from the following detailed description.

Technical Solution

In an aspect of the present disclosure, there is provided a method of performing a random access procedure by a user equipment (UE) in a 3rd generation partnership project (3GPP) based wireless communication system. The method may include: obtaining a random access channel (RACH) configuration for at least one of a plurality of uplink (UL) bandwidth parts (BWPs); selecting an initial UL BWP from among the plurality of UL BWPs; and transmitting a random access preamble on the initial UL BWP selected from among the plurality of UL BWPs based on the RACH configuration. The plurality of UL BWPs may include a first UL BWP related only to a first type of UE with reduced capability to support a smaller bandwidth than a predetermined bandwidth and a second UL BWP related to a second type of UE different from the first type of UE. The UE may be the first type of UE and configured to select the first UL BWP or the second UL BWP as the initial UL BWP depending on whether a predetermined condition is satisfied.

Based on that the predetermined condition is not satisfied even though the UE is the first type of UE, the UE may be configured to select the second UL BWP as the initial UL BWP.

Based on that capability of the UE does not support the second UL BWP, the UE may be configured to determine that the predetermined condition is satisfied and select the first UL BWP as the initial UL BWP.

Based on that capability of the UE supports the second UL BWP even though the UE is the first type of UE, the UE may be configured to determine that the predetermined condition is not satisfied and select the second UL BWP as the initial UL BWP.

Based on that the first UL BWP is available for the UE, the UE may be configured to determine that the predetermined condition is satisfied and select the first UL BWP as the initial UL BWP.

Based on that the first UL BWP is not available for the UE even though the UE is the first type of UE, the UE may be configured to determine that the predetermined condition is not satisfied and select the second UL BWP as the initial BWP.

Based on that the first UL BWP is available for the UE, the UE may be configured to determine that the predetermined condition is satisfied regardless of availability of the second UL BWP and select the first UL BWP as the initial UL BWP.

The UE may be configured determine availability of the first UL BWP based on higher layer information obtained from a network.

In another aspect of the present disclosure, there is provided a processor-readable storage medium having stored thereon a program for executing the above-described method.

In another aspect of the present disclosure, there is provided a device for 3GPP based wireless communication. The device may include: a memory configured to store instructions; and a processor configured to perform operations by executing the instructions. The operations performed by the processor may include: obtaining a RACH configuration for at least one of a plurality of UL BWPs; selecting an initial UL BWP from among the plurality of UL BWPs; and transmitting a random access preamble on the initial UL BWP selected from among the plurality of UL BWPs based on the RACH configuration. The plurality of UL BWPs may include a first UL BWP related only to a first type of device with reduced capability to support a smaller bandwidth than a predetermined bandwidth and a second UL BWP related to a second type of device different from the first type of device. The device may be the first type of device and configured to select the first UL BWP or the second UL BWP as the initial UL BWP depending on whether a predetermined condition is satisfied.

The device may further include a transceiver configured to transmit and receive a radio signal under control of the processor.

The device may be a UE for the 3GPP based wireless communication.

The device may be an application-specific integrated circuit (ASIC) or a digital signal processor.

In another aspect of the present disclosure, there is provided a method of performing, by a base station, a random access procedure with a UE in a 3GPP based wireless communication system. The method may include: transmitting a RACH configuration for at least one of a plurality of UL BWPs and at least one condition for selecting an initial UL BWP; and detecting a random access preamble in the plurality of UL BWPs based on the RACH configuration. The plurality of UL BWPs may include a first UL BWP related only to a first type of UE with reduced capability to support a smaller bandwidth than a predetermined bandwidth and a second UL BWP related to a second type of UE different from the first type of UE. The at least one condition for selecting the initial UL BWP may provide a criterion for the first type of UE to select one of the first UL BWP and the second UL BWP as the initial UL BWP.

In a further aspect of the present disclosure, there is provided a base station in a 3GPP based wireless communication system. The base station may include: a memory configured to store instructions; and a processor configured to perform operations by executing the instructions. The operations performed by the processor may include: transmitting a RACH configuration for at least one of a plurality of UL BWPs and at least one condition for selecting an initial UL BWP; and detecting a random access preamble in the plurality of UL BWPs based on the RACH configuration. The plurality of UL BWPs may include a first UL BWP related only to a first type of UE with reduced capability to support a smaller bandwidth than a predetermined bandwidth and a second UL BWP related to a second type of UE different from the first type of UE. The at least one condition for selecting the initial UL BWP may provide a criterion for the first type of UE to select one of the first UL BWP and the second UL BWP as the initial UL BWP.

Advantageous Effects

According to an embodiment of the present disclosure, a user equipment (UE) with reduced bandwidth capability may perform initial uplink (UL) bandwidth part (BWP) operation and a random access procedure more efficiently.

The effects of present disclosure are not limited to what has been particularly described hereinabove, and other effects that the present disclosure could achieve will be more clearly understood from the following detailed description.

DESCRIPTION OF DRAWINGS

FIG. 12 illustrates signal transmission and reception related to the proposals of the present disclosure.

FIG. 15 illustrates discontinuous reception (DRX) operation applicable to the present disclosure.

BEST MODE

Figure 1:
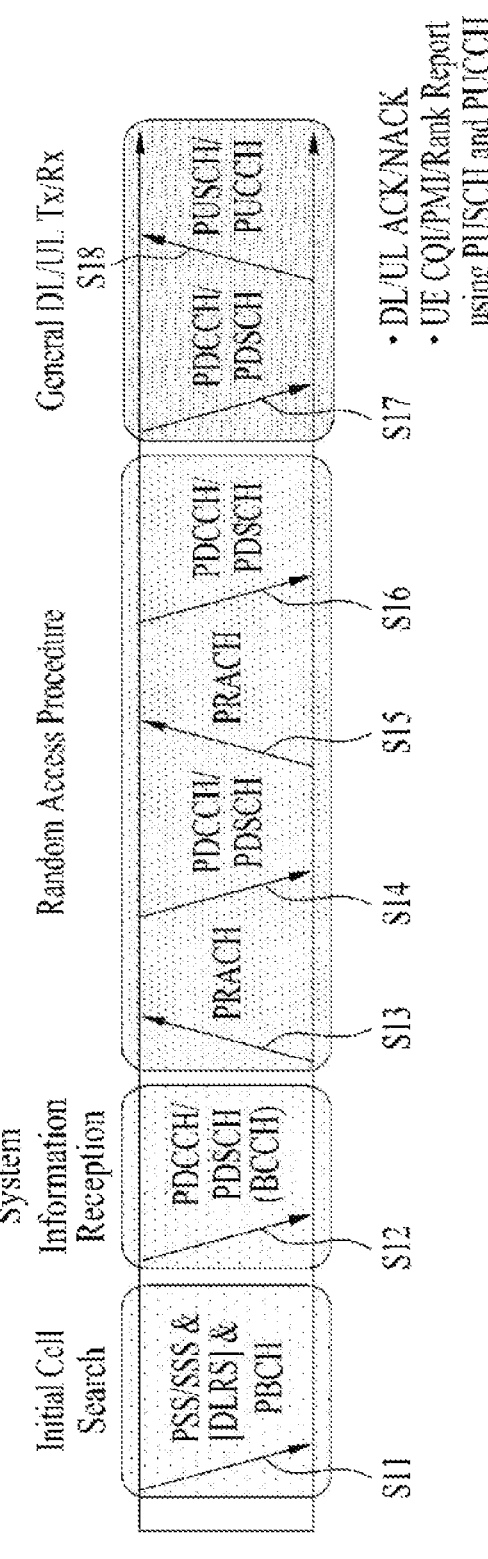
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto. LTE refers to technologies after 3GPP TS 36.xxx Release 8. Specifically, LTE technologies after 3GPP TS 36.xxx Release 10 are referred to as LTE-A, and LTE technologies after 3GPP TS 36.xxx Release 13 are referred to as LTE-A pro. 3GPP NR refers to technologies after TS 38.xxx Release 15. LTE/NR may be referred to as 3GPP systems. In this document, "xxx" represents the detail number of a specification. LTE/NR may be collectively referred to as 3GPP systems.

Details of the background, terminology, abbreviations, etc. used herein may be found in documents published before the present disclosure. For example, the present disclosure may be supported by the following documents:

3GPP LTE 36.211: Physical channels and modulation 36.212: Multiplexing and channel coding 36.213: Physical layer procedures 36.300: Overall description
36.321: Medium Access Control (MAC)
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.321: Medium Access Control (MAC)
38.331: Radio Resource Control (RRC) protocol specification
Technical Terms Used in this Document
PDCCH: Physical Downlink Control CHannel
PDSCH: Physical Downlink Shared CHannel
PUSCH: Physical Uplink Shared CHannel
CSI: Channel state information
RRM: Radio resource management
RLM: Radio link monitoring
DCI: Downlink Control Information
CAP: Channel Access Procedure
Ucell: Unlicensed cell
PCell: Primary Cell
PSCell: Primary SCG Cell
TBS: Transport Block Size
SLIV: Starting and Length Indicator Value (The SLIV is a field that indicates the starting symbol index and the number of symbols in a slot for a PDSCH and/or PUSCH, and the SLIV is carried on a PDCCH scheduling the corresponding PDSCH and/or PUSCH.)
BWP: BandWidth Part (The BWP may be composed of consecutive resource blocks (RBs) in the frequency domain, which may correspond to one numerology (e.g., subcarrier spacing, cyclic prefix (CP) length, slot/mini-slot duration, etc.). In addition, multiple BWPs may be configured on one carrier (the number of BWPs per carrier may be limited), but the number of active BWPs may be limited in each carrier (e.g., one).)
CORESET: COntrol REsourse SET (The CORESET refers to a time frequency resource region capable of transmitting a PDCCH, and the number of CORESETs per BWP may be limited.)
REG: Resource element group
SFI: Slot Format Indicator (The SFI is an indicator that indicates the DL/UL direction at the symbol level in specific slot(s), and the SFI is transmitted over a group-common PDCCH.)
COT: Channel occupancy time
SPS: Semi-persistent scheduling
PLMN ID: Public Land Mobile Network identifier
RACH: Random Access Channel
RAR: Random Access Response
Msg3: Message transmitted on UL-SCH containing a C-RNTI MAC CE or CCCH SDU, submitted from upper layer and associated with the UE Contention Resolution Identity, as part of a Random Access procedure.
Special Cell: For Dual Connectivity operation the term Special Cell refers to the PCell of the MCG or the PSCell of the SCG depending on if the MAC entity is associated to the MCG or the SCG, respectively. Otherwise the term Special Cell refers to the PCell. A Special Cell supports PUCCH transmission and contention-based Random Access, and is always activated.
Serving Cell: A PCell, a PSCell, or an SCell
In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, proposals and so on are distinguished from each other and indexed, for convenience of description, which does not mean that each of them necessarily constitutes an independent disclosure or that each of them should be implemented only individually. Unless explicitly contradicting each other, it may be derived/understood that at least some of the sections, embodiments, examples, options, methods, schemes, proposals and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

The SSB is composed of four consecutive OFDM symbols, each carrying the PSS, the PBCH, the SSS/PBCH, or the PBCH. Each of the PSS and the SSS includes one OFDM symbol by 127 subcarriers, and the PBCH includes three OFDM symbols by 576 subcarriers. The PBCH is encoded/decoded based on Polar codes, and modulation/demodulation is performed thereon according to quadrature phase shift keying (QPSK). The PBCH in the OFDM symbol consists of data resource elements (REs) to which a complex modulation value of the PBCH is mapped, and demodulation reference signal (DMRS) REs to which a DMRS for the PBCH is mapped. Three DMRS REs are configured for each RB in the OFDM symbol, and three data REs configured between DMRS REs.

The PSS may be used in detecting a cell ID within a cell ID group, and the SSS may be used in detecting a cell ID group. The PBCH may be used in detecting an SSB (time) index and a half-frame. There are 336 cell ID groups, and each cell ID group includes three cell IDs. Thus, there are a total of 1008 cell IDs.

SSBs are periodically transmitted with an SSB periodicity. A default SSB periodicity assumed by the UE in initial cell search is defined as 20 ms. After cell access, the SSB periodicity may be set to one of {5 ms, 10 ms, 20 ms, 40 ms, 80 ms, and 160 ms} by the network (e.g., BS). An SSB burst set may be configured at the beginning of the SSB periodicity. The SSB burst set may be set to a time window of 5 ms (i.e., half-frame), and the SSB may be repeatedly transmitted up to L times within the SS burst set. The maximum number of SSB transmissions L may be given depending carrier frequency bands as follows. One slot includes up to two SSBs.

For frequency range up to 3 GHz, L=4
For frequency range from 3 GHz to 6 GHz, L=8
For frequency range from 6 GHz to 52.6 GHz, L=64

The time-domain positions of candidate SSBs in the SS burst set may be defined depending on subcarrier spacings. The time-domain positions of the candidate SSBs are indexed from (SSB indices) 0 to L−1 in temporal order within the SSB burst set (i.e., half-frame).

Multiple SSBs may be transmitted within the frequency span of a carrier. Each SSB may not need to have a unique physical layer cell identifier, but different SSBs may have different physical layer cell identifiers.

The UE may acquire DL synchronization by detecting the SSB. The UE may identify the structure of the SSB burst set based on the detected SSB (time) index, and thus the UE may detect a symbol/slot/half-frame boundary. A frame/half-frame number to which the detected SSB belongs may be identified based on system frame number (SFN) information and half-frame indication information.

Specifically, the UE may obtain a 10-bit SFN for a frame to which a PBCH belongs from the PBCH. Then, the UE may obtain 1-bit half-frame indication information. For example, when the UE detects the PBCH in which the half-frame indication bit is set to 0, the UE may determine that an SSB to which the PBCH belongs is included in the first half-frame of the frame. When the UE detects the PBCH in which the half-frame indication bit is set to 1, the UE may determine that an SSB to which the PBCH belongs is included in the second half-frame of the frame. Finally, the UE may obtain the SSB index of the SSB to which the PBCH belongs based on a DMRS sequence and a PBCH payload carried by the PBCH.

After initial cell search, the UE may acquire more specific system information by receiving a physical downlink control channel (PDCCH) and receiving a physical downlink shared channel (PDSCH) based on information of the PDCCH in step S102.

System information (SI) is divided into a master information block (MIB) and a plurality of system information blocks (SIBs). The SI except for the MIB may be referred to as remaining minimum system information (RMSI). Details thereof will be described in the following.

The MIB includes information/parameters for monitoring a PDCCH scheduling a PDSCH carrying SIB1 (SystemInformationBlock1), and the MIB is transmitted by the BS over the PBCH of an SSB. For example, the UE may check based on the MIB whether there is a CORESET for a Type0-PDCCH common search space. The Type0-PDCCH common search space is a kind of PDCCH search space, which is used to transmit a PDCCH scheduling an SI message. If the Type0-PDCCH common search space exists, the UE may determine (1) a plurality of contiguous RBs and one or more consecutive symbols included in the CORESET and (ii) a PDCCH occasion (e.g., a time-domain location for PDCCH reception, based on information (e.g., pdcch-ConfigSIB1) in the MIB. If the Type0-PDCCH common search space does not exist, pdcch-ConfigSIB1 provides information on a frequency location at which the SSB/SIB1 exists and information on a frequency range where there are no SSB/SIB1.

SIB1 includes information related to availability and scheduling (e.g., transmission periodicity, SI-window size, etc.) of the remaining SIBs (hereinafter referred to as SIBx where x is an integer more than or equal to 2). For example, SIB1 may indicate whether SIBx is periodically broadcast or provided at the request of the UE in an on-demand manner. When SIBx is provided in an on-demand manner, SIB1 may include information necessary for the UE to send an SI request. SIB1 is transmitted over a PDSCH, and a PDCCH scheduling SIB1 is transmitted in the Type0-PDCCH common search space. That is, SIB1 is transmitted over the PDSCH indicated by the PDCCH.

SIBx is included in the SI message and transmitted on the PDSCH. Each SI message is transmitted within a periodically occurring time window (i.e., SI-window).

The UE may perform a random access procedure (e.g., 4-step RA procedure) to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

Hereinafter, a 2-step random access procedure will be described in brief. In the 2-step random access procedure, S103/S105 may be performed in one step (where the UE performs transmission) (message A), and S104/S106 may be performed in one step (where the BS performs transmission) (message B). Message A (MsgA) may include a preamble and a payload (PUSCH payload), and the preamble and payload may be multiplexed based on time division multiplexing (TDM). In response to MsgA, message B (MsgB) may be transmitted for contention resolution, fallback indication(s), and/or backoff indication. The 2-step random access procedure may be subdivided into a contention-based random access (CBRA) procedure and a contention-free random access (CFRA) procedure. In the CFRA procedure, the BS may provide the UE with information on a preamble that the UE needs to transmit in MsgA and information on PUSCH allocation before the UE transmits MsgA.

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

The NR system may support signal transmission/reception in unlicensed bands. According to regional regulations for unlicensed bands, a communication node in an unlicensed band needs to determine whether a channel is used by other communication node(s) before transmitting a signal. Specifically, the communication node may perform carrier sensing (CS) before transmitting the signal so as to check whether the other communication node(s) perform signal transmission. When it is determined that the other communication node(s) perform no signal transmission, it is said that clear channel assessment (CCA) is confirmed. When a CCA threshold is predefined or configured by higher layer signaling (e.g., RRC signaling), the communication node may determine that the channel is busy if the detected channel energy is higher than the CCA threshold. Otherwise, the communication node may determine that the channel is idle. When it is determined that the channel is idle, the communication node may start the signal transmission in a UCell. The sires of processes described above may be referred to as Listen-Before-Talk (LBT) or a channel access procedure (CAP). The LBT and CAP may be interchangeably used in this document.

Figure 2:
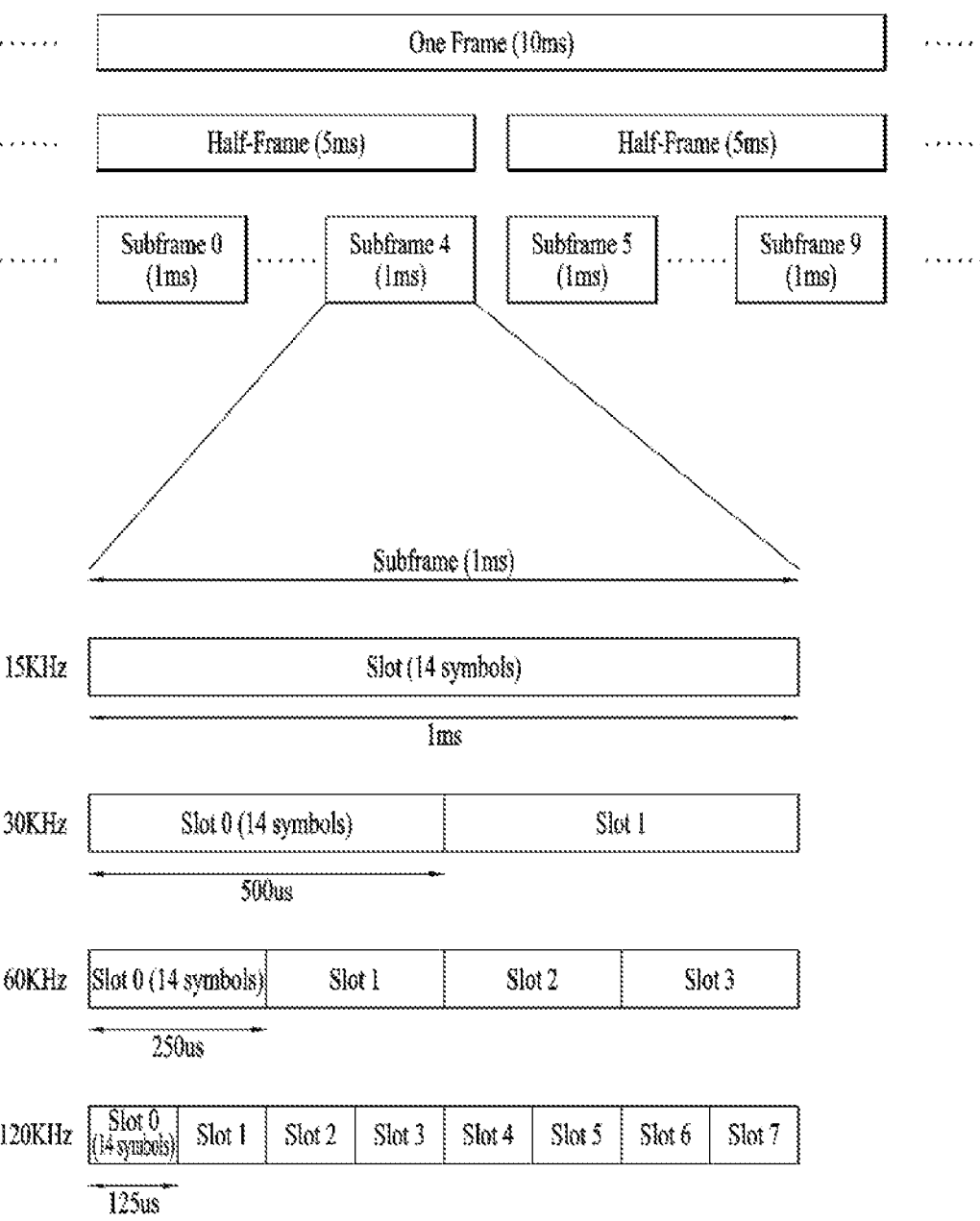
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS (15 * 2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot $N^{frame,u}_{slot}$: Number of slots in a frame $N^{subframe,u}_{slot}$: Number ofslots in a subframe Table 2 illustrates that the number of symbols per slot, the number of slots per frame, and the number of slots per subframe vary according to the SCS when the extended CP is used.

TABLE 2

| SCS (15 * 2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
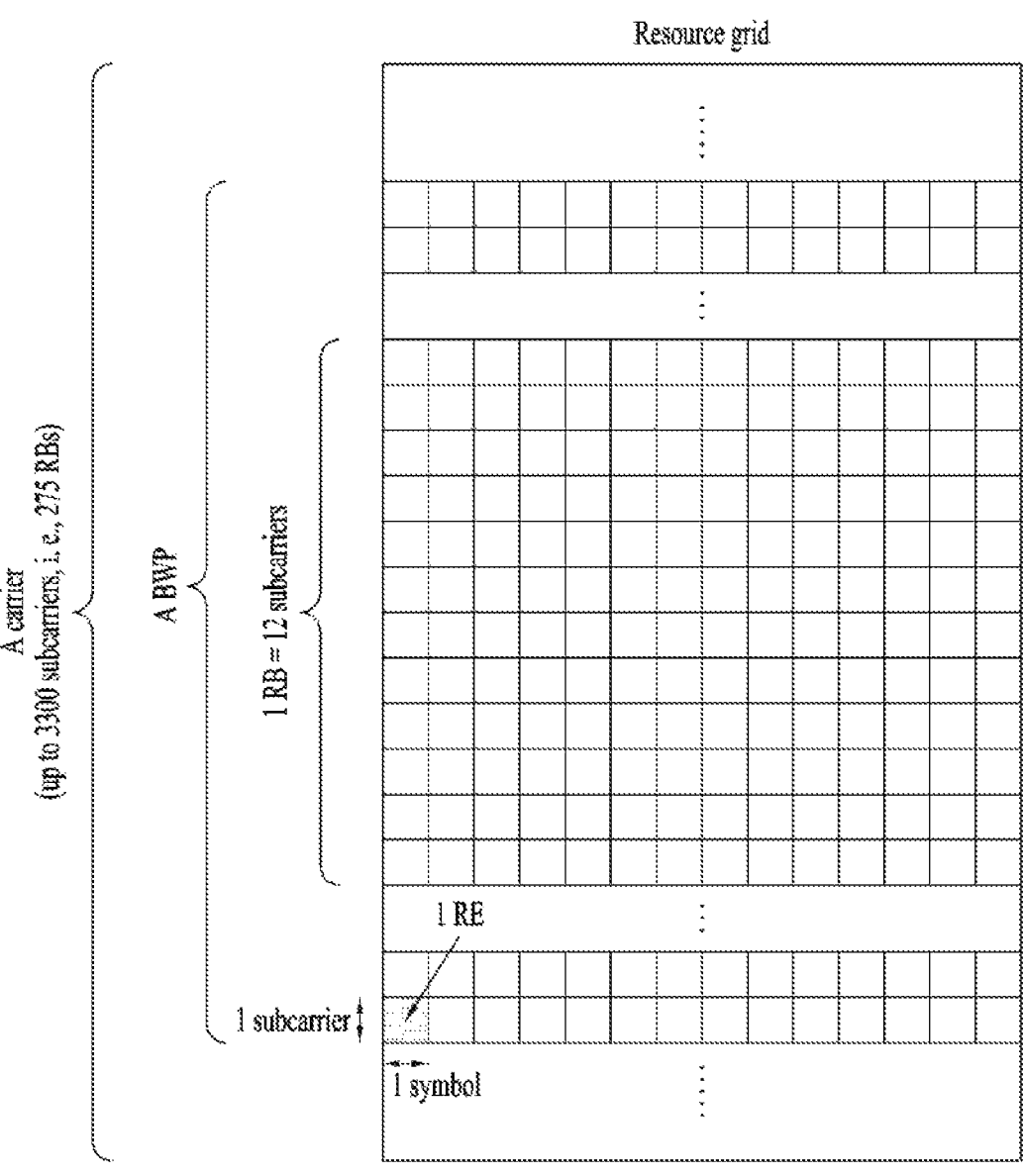
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Bandwidth Part (BWP)

The NR system may support up to 400 MHz for each carrier. The network may instruct the UE to operate only in a partial bandwidth rather than the whole bandwidth of such a wideband carrier. The partial bandwidth is referred to as a BWP. The BWP refers to a subset of contiguous common RBs defined for a numerology in the BWP of a carrier in the frequency domain, and one numerology (e.g., SCS, CP length, slot/mini-slot duration, etc.) may be configured.

Activation/deactivation of a DL/UL BWP or BWP switching may be performed according to network signaling and/or timers (e.g., L1 signaling corresponding to a physical layer control signal, a MAC control element corresponding to a MAC layer control signal, RRC signaling, etc.). While performing initial access or before setting up an RRC connection, the UE may not receive any DL/UL BWP configurations. A DL/UL BWP that the UE assumes in this situation is referred to as an initial active DL/UL BWP.

In 3GPP NR specifications, the following UE operations have been defined in relation to an initial UL BWP.

A UE determines time resources and frequency resources for PUSCH occasions in an active UL BWP from msgA-PUSCH-config for the active UL BWP. If the active UL BWP is not the initial UL BWP and msgA-PUSCH-config is not provided for the active UL BWP, the UE uses the msgA-PUSCH-config provided for the initial UL BWP.

If a UE does not have dedicated RRC configuration, or has an initial UL BWP as an active UL BWP, or is not provided startSymbolAndLengthMsgAPO, msgAtimeDomainAllocation provides a SLIV and a PUSCH mapping type for a PUSCH transmission by indicating first maxNrofUL-Allocations values from PUSCH-TimeDomainResourceAllocationList, if PUSCH-TimeDomainResourceAllocationList is provided in PUSCH-ConfigCommon entries, if PUSCH-TimeDomainResourceAllocationList is not provided in PUSCH-ConfigCommon else, the is provided a SLIV by startSymbolAndLength-MsgAPO, and a PUSCH mapping type by mapping-TypeMsgAPUSCH for a PUSCH transmission.

An active UL BWP, for a PUSCH transmission scheduled by a RAR UL grant is indicated by higher layers. For determining the frequency domain resource allocation for the PUSCH transmission within the active UL BWP if the active UL BWP and the initial UL BWP have same SCS and same CP length and the active UL BWP includes all RBs of the initial UL BWP, or the active UL BWP is the initial UL BWP, the initial UL BWP is used else, the RB numbering starts from the first RB of the active UL BWP and the maximum number of RBs for frequency domain resource allocation equals the number of RBs in the initial UL BWP If a UE does not have dedicated PUCCH resource configuration, provided by PUCCH-ResourceSet in PUCCH-Config, a PUCCH resource set is provided by pucch-ResourceCommon through an index to a row of predetermined Table for transmission of HARQ-ACK information on PUCCH in an initial UL BWP of $N_{BWP}^{size}$ PRBs.

If a UE is not provided initialDownlinkBWP, an initial DL BWP is defined by a location and number of contiguous PRBs, starting from a PRB with the lowest index and ending at a PRB with the highest index among PRBs of a CORESET for Type0-PDCCH CSS set, and a SCS and a cyclic prefix for PDCCH reception in the CORESET for Type0-PDCCH CSS set; otherwise, the initial DL BWP is provided by initialDownlinkBWP. For operation on the primary cell or on a secondary cell, a UE is provided an initial UL BWP by initialUplinkBWP. If the UE is configured with a supplementary UL carrier, the UE can be provided an initial UL BWP on the supplementary UL carrier by initialUplinkBWP.

Figure 4:
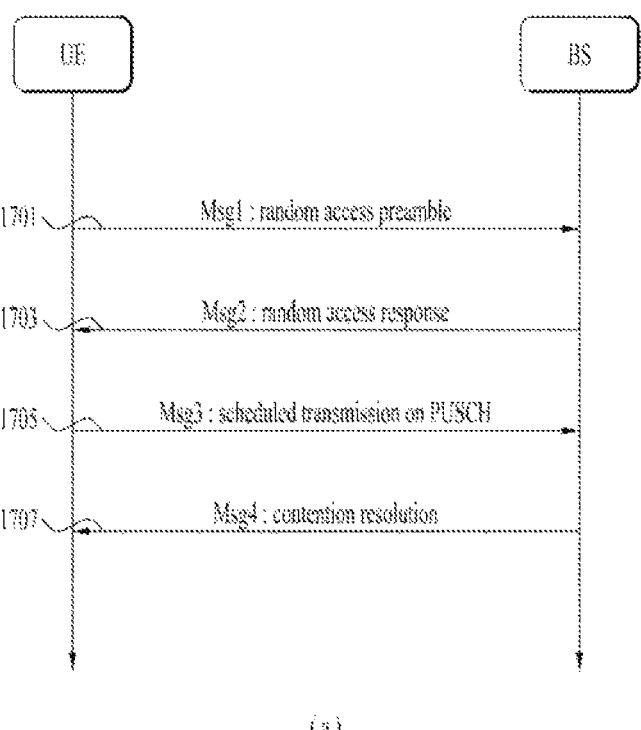
FIG. 4 illustrates a random access procedure.
Figure 4:
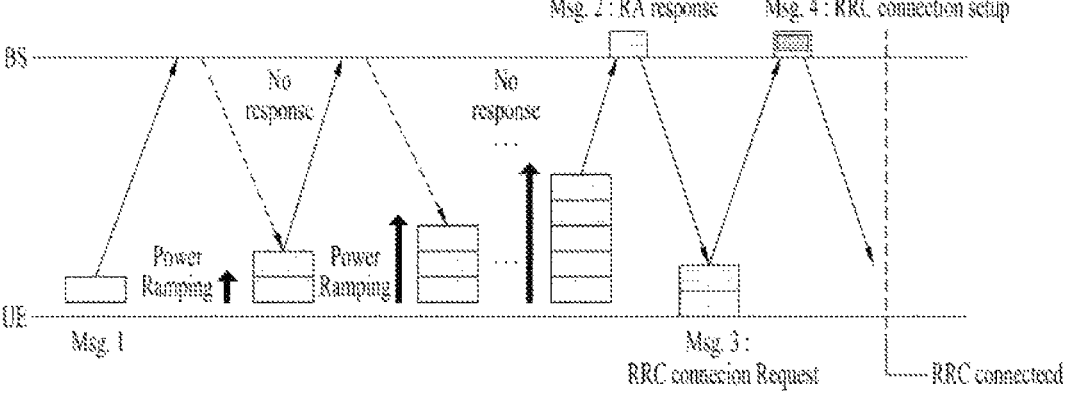

FIG. 4 illustrates an exemplary normal random access procedure. Specifically, FIG. 4 shows a contention-based random access procedure of the UE, which is performed in four steps.

First, the UE may transmit message 1 (Msg1) including a random access preamble on a PRACH (see 1701 of FIG. 4(a)).

Random access preamble sequences with different lengths may be supported. A long sequence length of 839 may be applied to SCSs of 1.25 and 5 kHz, and a short sequence length of 139 may be applied to SCSs of 15, 30, 60, and 120 kHz.

Multiple preamble formats may be defined by one or more RACH OFDM symbols and different CPs (and/or guard times). A RACH configuration for a cell may be included in SI about the cell and provided to the UE. The RACH configuration may include information on the SCS of the PRACH, available preambles, preamble formats, and so on. The RACH configuration may include information about association between SSBs and RACH (time-frequency) resources. The UE transmits a random access preamble on a RACH time-frequency resource associated with a detected or selected SSB.

The threshold of an SSB for RACH resource association may be configured by the network, and a RACH preamble may be transmitted or retransmitted based on an SSB where reference signal received power (RSRP), which is measured based on the SSB, satisfies the threshold. For example, the UE may select one SSB from among SSBs that satisfy the threshold and transmit or retransmit the RACH preamble based on a RACH resource associated with the selected SSB.

Upon receiving the random access preamble from the UE, the BS may transmit message 2 (Msg2) corresponding to a random access response (RAR) message to the UE (see 1703 of FIG. 4(a)). A PDCCH scheduling a PDSCH carrying the RAR may be CRC masked with a random access (RA) radio network temporary identifier (RNTI) (RA-RNTI) and then transmitted. Upon detecting the PDCCH masked by the RA-RNTI, the UE may obtain the RAR from the PDSCH scheduled by DCI carried by the PDCCH. The UE may check whether the RAR includes RAR information in response to the preamble transmitted by the UE, i.e., Msg1. The presence or absence of the RAR information in response to Msg1 transmitted by the UE may be determined depending on whether there is a random access preamble ID for the preamble transmitted by the UE. If there is no response to Msg1, the UE may retransmit the RACH preamble within a predetermined number of times while performing power ramping. The UE may calculate PRACH transmit power for retransmitting the preamble based on the most recent path loss and power ramping counter.

The RAR information transmitted on the PDSCH may include timing advance (TA) information for UL synchronization, an initial UL grant, and a temporary cell-RNTI (C-RNTI). The TA information may be used to control a UL signal transmission timing. The UE may transmit a UL signal over a UL shared channel as message 3 (Msg3) of the random access procedure based on the RAR information (see 1705 of FIG. 4(a)). Msg3 may include an RRC connection request and a UE identifier. In response to Msg3, the network may transmit message 4 (Msg4), which may be treated as a contention resolution message on DL (see 1707 of FIG. 4(a)). Upon receiving Msg4, the UE may enter the RRC_CONNECTED state.

On the other hand, a contention-free random access procedure may be performed when the UE is handed over to another cell or BS or when it is requested by the BS. In the contention-free random access procedure, a preamble to be used by the UE (hereinafter referred to as a dedicated random access preamble) is allocated by the BS. Information on the dedicated random access preamble may be included in an RRC message (e.g., handover command) or provided to the UE through a PDCCH order. When the random access procedure is initiated, the UE may transmit the dedicated random access preamble to the BS. When the UE receives an RAR from the BS, the random access procedure is completed.

As described above, a UL grant in the RAR may schedule PUSCH transmission to the UE. A PUSCH carrying initial UL transmission based on the UL grant in the RAR is referred to as an Msg3 PUSCH. The content of an RAR UL grant may start at the MSB and end at the LSB, and the content may be given as shown in Table 3.

TABLE 3

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

Figure 5:
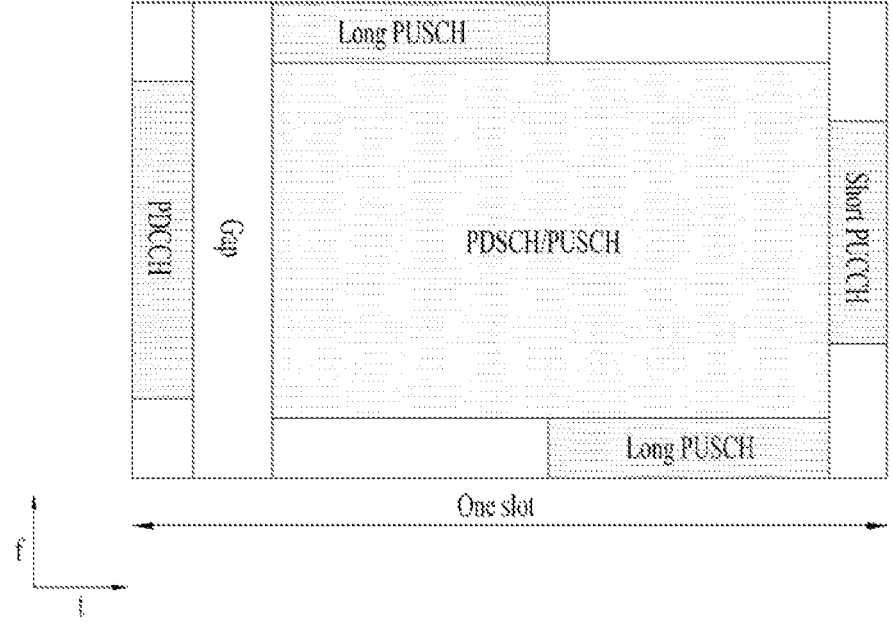
FIG. 5 illustrates an example of physical channel mapping.
Figure 6:
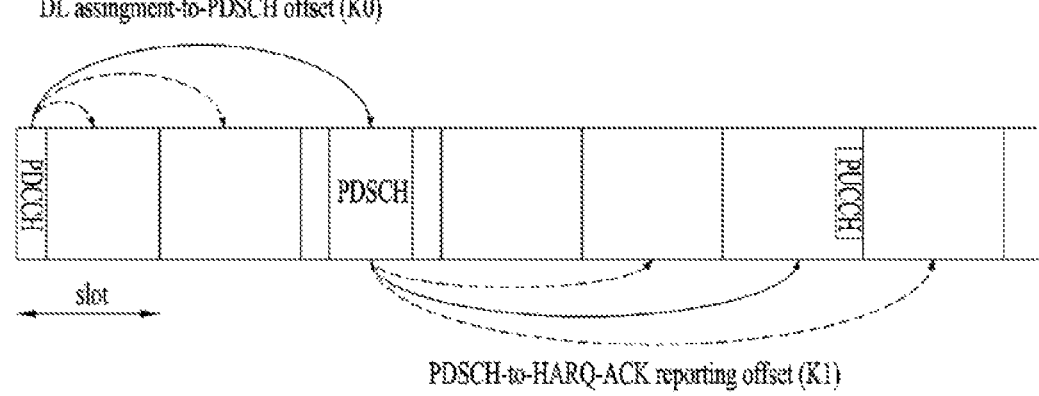
FIG. 6 illustrates an exemplary acknowledgment/negative acknowledgment (ACK/NACK) transmission process.
Figure 7:
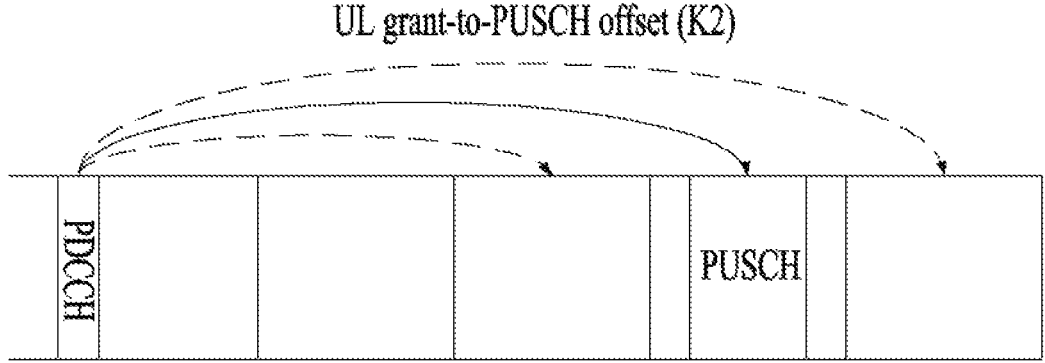
FIG. 7 illustrates an exemplary physical uplink shared channel (PUSCH) transmission process.
Figure 8:
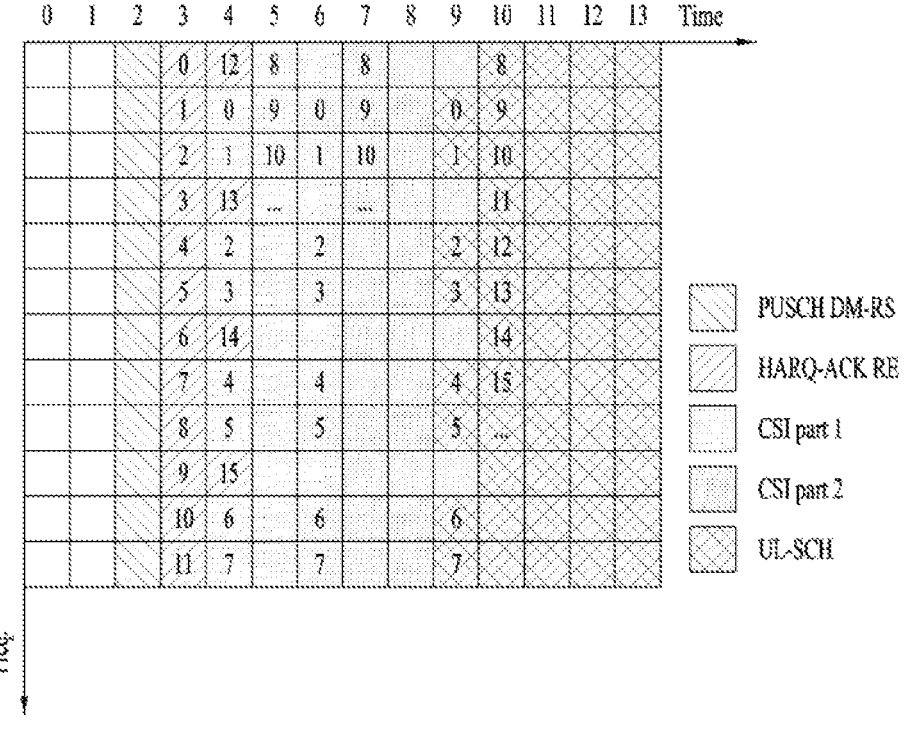
FIG. 8 illustrates an example of multiplexing control information in a PUSCH.

FIG. 5 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured through higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.

monitoringSlotPeriodicityAndOffset: A PDCCH monitoring periodicity (in slots) and a PDCCH monitoring offset (in slots).

monitoringSymbolsWithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each AL=$\{1, 2, 4, 8, 16\}$.

An occasion (e.g., time/frequency resources) in which the UE is to monitor PDCCH candidates is defined as a PDCCH (monitoring) occasion. One or more PDCCH (monitoring) occasions may be configured in a slot.

Table 4 shows the characteristics of each SS.

TABLE 4

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 5 shows DCI formats transmitted on the PDCCH.

TABLE 5

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR (Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Initial UL BWP Selection and Initial Access for Cell Access of UE

In general, the UE needs to support specific UE capability in order to access a cell. For example, to access an LTE cell, the UE needs to be capable of receiving an MIB and SIB(s) broadcast for the cell by the BS. Since there are several types of SIB (e.g., SIB1, SIB2 . . . , SIBx-y, etc.) and the SIB is transmitted in a plurality of PRBs, the UE intending to access the LTE cell needs to have an ability to receive a bandwidth of 20 MHz at least.

To access an NR cell, the UE needs to be capable of receiving an MIB in an SSB/PBCH transmitted in an initial DL BWP. Even when the UE is capable of receiving the SSB/PBCH, the UE also needs to check whether the UE is allowed to access the corresponding cell, based on cell access information included in SIB1. To this end, the UE may check whether there is a CORESET for a Type0-PDCCH common search space (CSS), based on the MIB. If the Type0-PDCCH CSS exists, the UE may determine CORSET0 and a PDCCH occasion based on information in the MIB (e.g., pdcch-ConfigSIB1). Then, the UE may receive SIB1 over a PDSCH indicated by a PDCCH received on the corresponding PDCCH occasion.

Upon receiving the SIB, the UE needs to check various information to determine whether the UE is allowed to access the cell. If the information does not satisfy some conditions, the UE may set the corresponding cell as an access-prohibited cell. For example, the maximum UL channel bandwidth supported by the UE needs to be greater than or equal to the bandwidth of an initial UL BWP, and the maximum DL channel bandwidth supported by the UE needs be greater than or equal to the bandwidth of the initial DL BWP. If this condition is not satisfied, the UE may set the corresponding cell as the access-prohibited cell.

REL-17 NR intends to support a new type of UE with reduced capability. This type of UE is called an R-terminal or R-UE different from the legacy REL-15 UE.

Since the UE capability of the R-UE is limited compared to that of the legacy UE, a problem may occur in the cell access process. For example, the R-UE may be incapable of receiving the MIB in the initial DL BWP of the legacy NR cell. In addition, even if the R-UE is allowed to receive the MIB, the R-UE may be incapable of receiving a PDCCH scheduling CORSET #0 or SIB1. Alternatively, the maximum UL channel bandwidth or maximum DL channel bandwidth of the R-UE may not be greater than or equal to the bandwidth of the initial BWP supported by legacy NR cells. Alternatively, considering the numerology supported by the initial BWP of the legacy cell, the R-UE may not receive a paging message transmitted from the BS or may not perform UL RACH transmission for initial access due to the SCS. Due to these problems, a normal NR cell may be set as the access-prohibited cell frequently from the perspective of the R-UE.

The BS may need to provide a common channel transmission/reception method suitable for the R-UE at the beginning of the initial access process for the following reasons. First, the legacy UE may receive up to four transmissions: paging, MIB, SIB1, and unicast, based on frequency division multiplexing (FDM), but the number of channels that the R-UE is capable of simultaneously receiving may decrease due to the limited capability of the R-UE. Second, the numerology required for user services suitable for the R-UE may be different from the numerology accessible by normal UEs, and thus, the numerology of the initial BWP of the legacy cell may not be suitable for the R-UE. Third, the cell coverage of the R-UE may be reduced compared to that of the legacy UE due to limited RF capability. Finally, the R-UE may require an improved power saving technique compared to the legacy UE.

Therefore, the present disclosure proposes a method in which when an R-UE with limited capability performs initial access to a wireless network system through one cell, a BS managing the corresponding cell provides an initial UL BWP available to the R-UE and/or a method in which the R-UE performs initial access based on the initial UL BWP. In particular, the BS may provide two or more initial UL BWPs for the cell, and the UE may select one initial UL BWP from among a plurality of initial UL BWPs depending on the capability supported by the UE and/or at least some of the conditions, which will be described later. In addition, the UE may perform random access within the limited UE capability.

The following operations may be provided for the UE.

Figure 9:
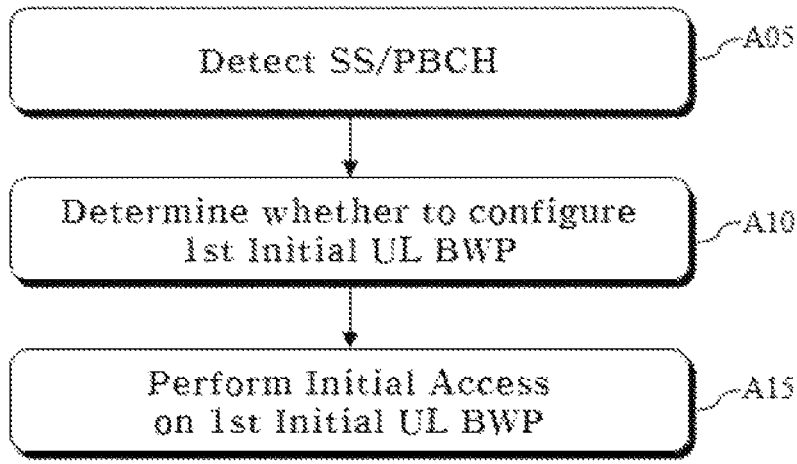
FIGS. 9 and 10 illustrate user equipment (UE) operations related to proposals of the present disclosure.

FIG. 9 is a diagram for explaining UE operations in an initial UL BWP according to an embodiment of the present disclosure.

Referring to FIG. 9, the UE may detect a synchronization channel and receive master information for a cell (A05). The synchronization channel may correspond to an SSB. The master information may correspond to an MIB.

The UE may determine whether to configure a first initial UL BWP compatible with a first type of UEs based on the capability of the UE (A10).

The first type of UEs may have reduced capability compared to a second type of UEs corresponding to Rel-15 NR UEs.

The first initial UL BWP may be compatible with at least the first type of UEs, while a second initial UL BWP may be compatible with at least the second type of UEs.

The first initial UL BWP and the second initial UL BWP may provide different PRACH resources, and the configuration of the corresponding PRACH resources may be provided by SIB1 received in a first initial DL BWP mapped to the first initial UL BWP.

If one or more of the following conditions are satisfied, the UE may perform initial access to the cell based on the first initial UL BWP (A15). The UE may activate the first initial DL BWP to receive a response from the network and deactivate the second initial UL BWP used by the second type of UEs during initial access.

When the capability of the UE is incapable of supporting the second initial UL BWP of the cell, When the first initial UL BWP is associated with at least the first type of UEs, the association may be indicated by system information of the cell.

For the UE, when the priority of the first initial UL BWP is higher than the priority of the second initial UL BWP, If Quality of Service (QoS) requirements are compatible with the first initial UL BWP, the QoS requirements may correspond to one or more of a delay, a priority, a data rate, reliability, and a communication range, which are mapped to the type of the UE, a service, a procedure, or a cause triggering the initial access.

When the UE is prohibited to use the second initial UL BWP or a DL BWP mapped to the second initial UL BWP, When a RSRP measurement result on the SSB for the cell is lower than a threshold (or higher than the threshold), When the congestion level of the second initial UL BWP (e.g., the number of LBT failures) is higher than a threshold, When there is no RACH preamble associated with an SSB beam index having an RPRP measurement result higher than a threshold, a set of RACH preambles configured for the first initial UL BWP are separated from a set of RACH preambles configured for the second initial UL BWP.

The UE transmits a RACH preamble or RACH MsgA (e.g., 2-step RACH MsgA) on RACH resources configured on the first initial UL BWP for the initial access to the cell. Then, the UE receives an RAR or RACH MsgB on an initial DL BWP mapped to the first initial UL BWP for the initial access to the cell. The initial DL BWP may also provide one or more of an SSB, an MIB, SIB1, other system information except for SIB1, and paging at least for the first type of UE.

Hereinafter, the first initial UL BWP is referred to as an initial UL R-BWP, and the second initial UL BWP is referred to as an initial UL BWP.

Transmission Side (e.g., UE):

According to the proposal of the present disclosure, the R-UE may receive SIB1 (newly) configured for the R-UE if a specific condition is satisfied. For example, when the R-UE is incapable of receiving legacy SIB1 transmission, when legacy SIB1 is not related to the R-UE (e.g., when legacy SIB1 is not SIB1 for the R-UE), and/or when the R-UE needs to receive additional R-UE-dedicated information in addition to the legacy SIB1 information, the R-UE may receive new SIB1. For convenience, SIB1 capable of being receiving by the R-UE is referred to as R-SIB1. R-SIB1 may include all or part of configuration information included in legacy SIB1, and R-SIB1 may also include configuration information dedicated to the R-UE. The legacy UE may not receive R-SIB1.

When the legacy UE is in the idle mode, the legacy UE may activate an initial DL BWP to receive system information or paging messages. However, the R-UE may not support a legacy initial DL BWP, or the legacy initial DL BWP may not be suitable for the operation of the R-UE. Accordingly, the R-UE may operate (e.g., receive system information or paging messages) by activating an initial DL R-BWP dedicated to the R-UE.

Thus, while the UE performs a RACH procedure for initial access, the UE may need to receive DL transmission in the initial DL BWP or initial DL R-BWP.

The R-UE may (i) perform the RACH procedure in an initial UL BWP or initial UL R-BWP based on the same RACH configuration information as that provided to the legacy UE, (ii) perform the RACH procedure in the initial UL BWP or initial UL R-BWP based on RACH configuration information dedicated to the R-UE, or (iii) perform the RACH procedure in the initial UL BWP or initial UL R-BWP based on both (at least parts of) the RACH configuration information for the legacy UE and the RACH configuration information dedicated to the R-UE (e.g., based on configuration information obtained by combining/merging the RACH configuration information for the legacy UE and the RACH configuration information dedicated to the R-UE).

Similarly to the legacy UE, the R-UE may also perform the RACH procedure in the following cases: (i) when the UE requests or resumes an RRC connection; (ii) when the UE is handed over to an adjacent cell or performs secondary cell group (SCG) addition; (iii) when the UE sends a scheduling request to the BS; (iv) when the BS instructs the UE to perform random access in a PDCCH order; (v) when the UE requests system information; and/or (vi) when the UE detects a beam failure or RRC connection failure.

When the UE in the idle mode or connected mode performs the 4-step or 2-step RACH procedure, the R-UE may perform at least some of the following operations.

Operation 1) The R-UE may measure SSB beam(s) or CSI-RS beam(S) in the initial DL BWP or initial DL R-BWP. The UE may select a RACH preamble and a PRACH resource linked/corresponding/mapped (e.g., logically mapped) to the index of the best SSB (i.e., the best beam) or the index of the CSI-RS. In this case, a DL BWP used by the UE to measure the beam(s) during the RACH procedure may be indicated by RACH configuration information in SIB1 or R-SIB1. Alternatively, the UE may select the RACH preamble and PRACH resource corresponding to the best beam by measuring the SSB beam(s) or CSI-RS beam(s) based on an active DL BWP. For example, if the initial DL R-BWP is active, the UE may measure the SSB beam(s) or CSI-RS beam(s) in the initial DL R-BWP. On the other hand, if the initial DL R-BWP is not active, but if the legacy initial DL BWP is active, the UE may select the RACH preamble and PRACH resource corresponding to the best beam by measuring the SSB beam(s) or CSI-RS beam(s) in the legacy initial DL BWP.

If the BS provides a RACH preamble set and a PRACH resource set allocated exclusively for the UE in SIB1 or R-SIB1, the R-UE may need to select the RACH preamble and PRACH resource corresponding to the best beam from the RACH preamble set and PRACH resource set allocated exclusively for the R-UE. Accordingly, upon receiving a RACH preamble/resource dedicated to the R-UE, the BS may know that the UE is the R-UE, so that the BS may perform subsequent message transmission/reception suitable for the R-UE. If there is no RACH preamble set and/or no PRACH resource set allocated exclusively for the R-UE, the R-UE may select the RACH preamble and PRACH resource corresponding to the best beam from a RACH preamble set and a PRACH resource set shared between the R-UE and the legacy UE.

In this case, the R-UE may select/configure an initial UL BWP or initial UL R-BWP where the RACH preamble and PRACH resource selected by the UE are located. The R-UE may select the initial UL BWP and/or initial UL R-BWP according to one or more of the following conditions. Independently of or in addition to selecting the initial UL BWP/R-BWP, the R-UE may also select an initial DL BWP and/or an initial DL R-BWP according to one or more of the following conditions (e.g., B05 of FIG. 10).

Condition 1: If the capability of the R-UE does not support the initial UL BWP, the R-UE may select the initial UL R-BWP. Otherwise, the R-UE may select the initial UL BWP.

Condition 2: If the initial UL R-BWP is available to the R-UE, the R-UE may select the initial UL R-BWP. Otherwise, the R-UE may select the initial UL BWP. The availability of the R-BWP may be obtained/determined by system information (e.g. SIB1 or R-SIB1) transmitted by the cell or a UE-specific signal provided by the network.

Condition 3: If the priority of the initial UL R-BWP is higher than the priority of the initial UL BWP, the R-UE may select the initial UL R-BWP. The priority information may be obtained from system information (e.g. SIB1 or R-SIB1) transmitted by the cell or a UE-dedicated signal provided by the network.

Condition 4: If the initial UL R-BWP satisfies QoS requirements (and if the initial UL BWP does not satisfy the QoS requirements), the R-UE may select the initial UL R-BWP. In this case, the QoS requirements may be mapped/related to a delay, a priority, a transmission rate, a transmission data amount, reliability and/or a communication range in meter, which may include one, some, or all of them. The QoS requirements may be determined/configured based on at least one of the following: a UE type (e.g., normal smartphone, smart watch, IoT device, etc.); a UE category (e.g., Category 0, Category 1, etc.) (e.g., BWP determination/selection based on the UE category); a UE capability as specified in TS 38.331; a reason for RACH transmission (e.g. high priority access, delay tolerant access, mobile originating signaling, mobile originating data, etc.); a procedure triggering RACH transmission (e.g. RRC connection establishment, RRC connection resumption, RRC connection reset, system information request, RAN area update, tracking area update, etc.); and/or a service or application triggering RACH transmission (e.g. massive MTC, URLLC, short message, sensor information, CCTV video, factory automation command, image file, firmware upgrade, etc., as identified by upper layers with an service ID or an application ID).

Condition 5: When the R-UE is prohibited to perform RACH transmission in the initial UL BWP or perform access on the initial UL BWP, the R-UE may select the initial UL R-BWP.

Condition 6: When the cell quality measured on an SSB or CSI-RS is lower than or equal to a specific threshold (or higher than or equal to the specific threshold), the R-UE may select the initial UL R-BWP. Otherwise, the R-UE may select the initial UL BWP.

Condition 7: If the congestion level of the initial UL BWP is higher than or equal to a specific level, the R-UE may select the initial UL R-BWP. Otherwise, the R-UE may select the initial UL BWP. For example, when LBT for RACH transmission in the initial UL BWP fails a prescribed number of times or more (e.g., when the number of times that the channel is determined to be busy after LBT is greater than or equal to a threshold), the R-UE may switch to/select the initial UL R-BWP.

Condition 8: When a RACH preamble and a PRACH resource of the initial UL BWP are separated from a RACH preamble and a PRACH resource of the initial UL R-BWP, the R-UE may select the initial UL BWP or initial UL R-BWP where the best beam is located. That is, if the best beam is not in the initial UL BWP, the R-UE may select the initial UL R-BWP. Alternatively, if the best beam is not in the initial UL R-BWP, the R-UE may select the initial UL BWP.

Figure 10:
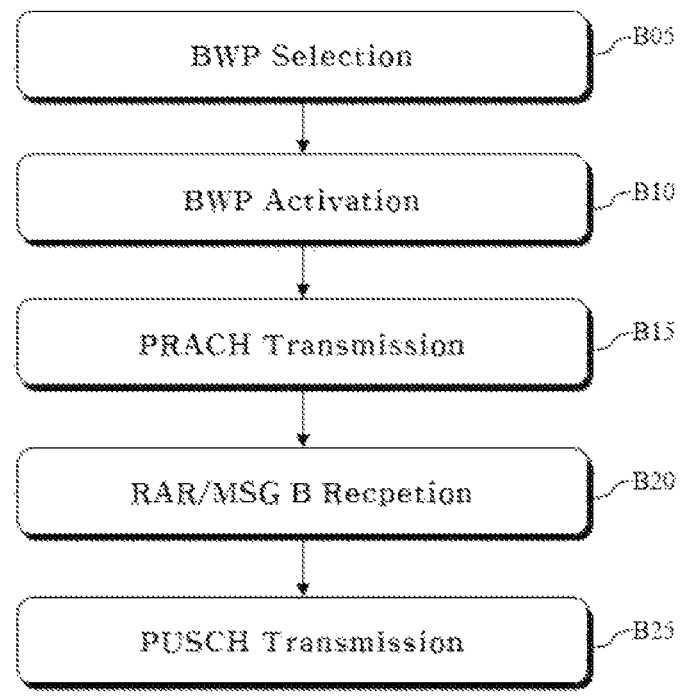

Operation 2) The R-UE may activate the selected BWP (e.g., B10 of FIG. 10). For example, if the R-UE selects the initial UL R-BWP, the R-UE may activate the initial UL R-BWP and an initial DL BWP or initial DL R-BWP mapped to the initial UL R-BWP. In this case, the R-UE may deactivate the initial UL BWP or may maintain the initial UL BWP in the active state. On the other hand, the R-UE may deactivate the initial DL BWP or initial DL R-BWP mapped to the initial UL BWP or may maintain the initial DL BWP or initial DL R-BWP in the active state. The R-UE may receive configuration information on the initial DL BWP or initial DL R-BWP mapped to the initial UL R-BWP in SIB1, R-SIB1, or a UE-specific signal.

Operation 3) The UE may transmit a RACH preamble or RACH MsgA in the active BWP based on a previously selected RACH preamble and/or PRACH resource (e.g., B15 of FIG. 10). If the UE receives no response from the BS, the UE may select a RACH preamble and/or PRACH resource in the same way as in the above-described process and then transmit a RACH preamble (Msg1) or RACH MsgA in the active BWP. In this case, the UE may reselect the BWP in the same way as in the above-described process. If the reselected BWP is different from the initially selected BWP, the UE may deactivate the initially selected UL BWP and a DL BWP mapped/associated therewith.

Operation 4) After transmitting a RACH preamble (Msg1) or RACH MsgA, the UE may attempt to receive a response (e.g., RAR or MsgB) from the BS in the active initial DL BWP or initial DL R-BWP (e.g., B20 of FIG. 10). For example, if a Type1-PDCCH common search space (CSS) set is configured by PDCCH-ConfigCommon, the UE may monitor a PDCCH having attached a CRC scrambled by an RA-RNTI or temporary C-RNTI in the corresponding CSS.

In this case, the CSS for RACH responses may be located in the initial DL BWP or initial DL R-BWP depending on configuration information provided by the BS. For example, the R-UE may transmit a RACH preamble or RACH MsgA in the initial UL R-BWP and monitor DCI scrambled by a RA-RNTI in the CSS of the initial DL BWP. Alternatively, the R-UE may transmit a RACH preamble or RACH MsgA in the initial UL R-BWP and monitor DCI scrambled by a RA-RNTI in the CSS of the initial DL R-BWP. In this case, the DCI may indicate a DL BWP in which the R-UE needs to receive a PDSCH. For example, the received DCI may indicate the initial DL BWP or initial DL R-BWP. Alternatively, SIB1 or R-SIB1 may indicate the DL BWP in which the R-UE needs to receive the PDSCH. The R-UE may select and activate the indicated DL BWP and receive the PDSCH in the DL BWP.

For example, the UE may interpret/assume that a BWP in which Msg2 is received corresponds to an R-BWP. The BWP interpreted/assumed by the UE as the R-BWP may be an R-BWP different from a legacy UE BWP. However, the BWP may be the same as the legacy UE BWP or overlap at least partially with the legacy UE BWP.

Operation 5) When DCI received on a PDCCH is based on a C-RNTI (e.g., a PDCCH CRC-scrambled with a C-RNTI), and when the corresponding C-RNTI is the same as the C-RNTI of the R-UE or when an RAR MAC control element (CE) included in a PDSCH indicates a RACH preamble selected by the UE, the R-UE may determine that Msg2 is successfully received.

In this case, the RAR MAC CE (e.g., Msg2 PDSCH), PDCCH (e.g., Msg2 PDCCH), or MsgB may instruct the UE to switch to a specific UL BWP for Msg3 transmission or subsequent UL transmission. For example, the message may instruct the UE to switch to the initial UL BWP or initial UL R-BWP. According to the instruction, the UE may activate the UL BWP which the UE switches to and deactivate the previous UL BWP.

6) The R-UE may transmit a UL signal (e.g., PUSCH) on UL resources allocated by the RAR MAC CE or PDCCH in the activated UL BWP (B25).

Reception Side (e.g., BS):

In the above-described examples, from the perspective of the BS, one cell needs to simultaneously operate two types of SIB1: SIB1 and R-SIB1. For example, one type of MIB may be mapped to both the two types of SIB1. Alternatively, an MIB may be mapped to/associated with legacy SIB1, and legacy SIB1 may be mapped to/associated with R-SIB1. In addition, legacy SIB1 and/or R-SIB1 may include scheduling information (e.g., schedulingInfoList) informing whether other SIBs are broadcast or not and transmission periods thereof. Further, one cell may simultaneously operate legacy SIBx and new SIBx.

New SIBx may include R-UE-dedicated information or information not related to legacy UEs, which is referred to as R-SIBx.

The BS may provide RACH configuration information available to the R-UE in SIB1 or R-SIB1 through one cell.

Figure 11:
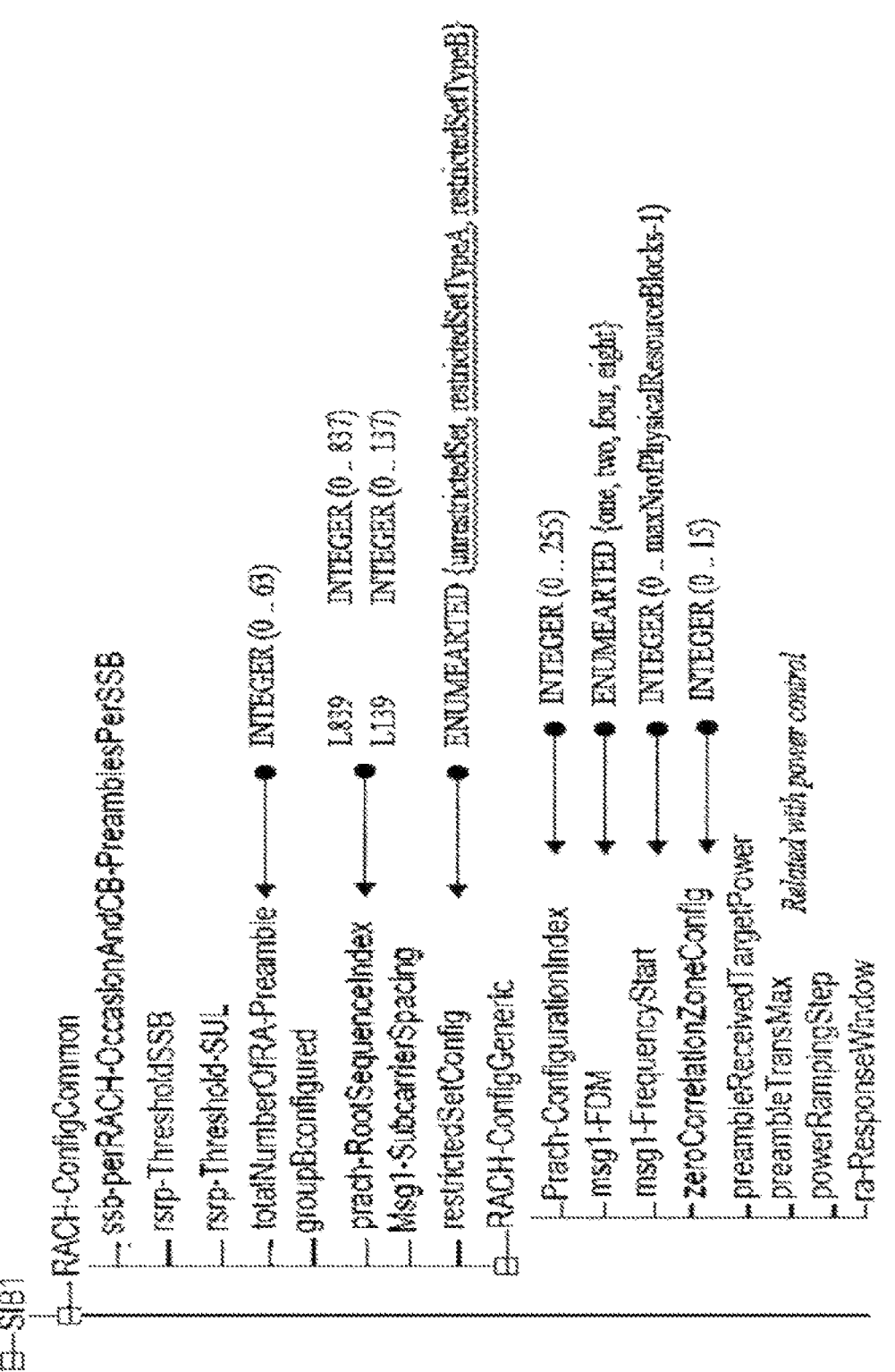
FIG. 11 illustrates exemplary random access channel (RACH) configuration information in SIB1/R-SIB1.

FIG. 11 illustrates exemplary RACH configuration information in SIB1 or R-SIB1.

Referring to FIG. 11, all parameters of RACH-Config-Common may be included in SIB1, or all the parameters may be included in R-SIB1. Alternatively, some parameters may be included in SIB1, and some parameters may be included in R-SIB1. Accordingly, the R-UE may perform the RACH procedure by receiving only SIB1, receiving only R-SIB1, or receiving both SIB1 and R-SIB1. Here, R-SIB1 may be replaced with SIBx. Specifically, SIBx may carry some or all of the RACH configuration information on behalf of R-SIB1. For example, information on a BWP (e.g., initial UL BWP, initial UL R-BWP, initial DL BWP and/or initial DL R-BWP) to which the RACH configuration information of FIG. 11 is applicable may be additionally included in the corresponding RACH configuration information.

According to the present disclosure, a UE with limited capability is allowed to properly configure an initial UL BWP dedicated thereto depending on specific conditions, and thus, the UE may properly perform initial UL transmission even in a cell where the UE coexists with legacy UEs.

Figure 12:
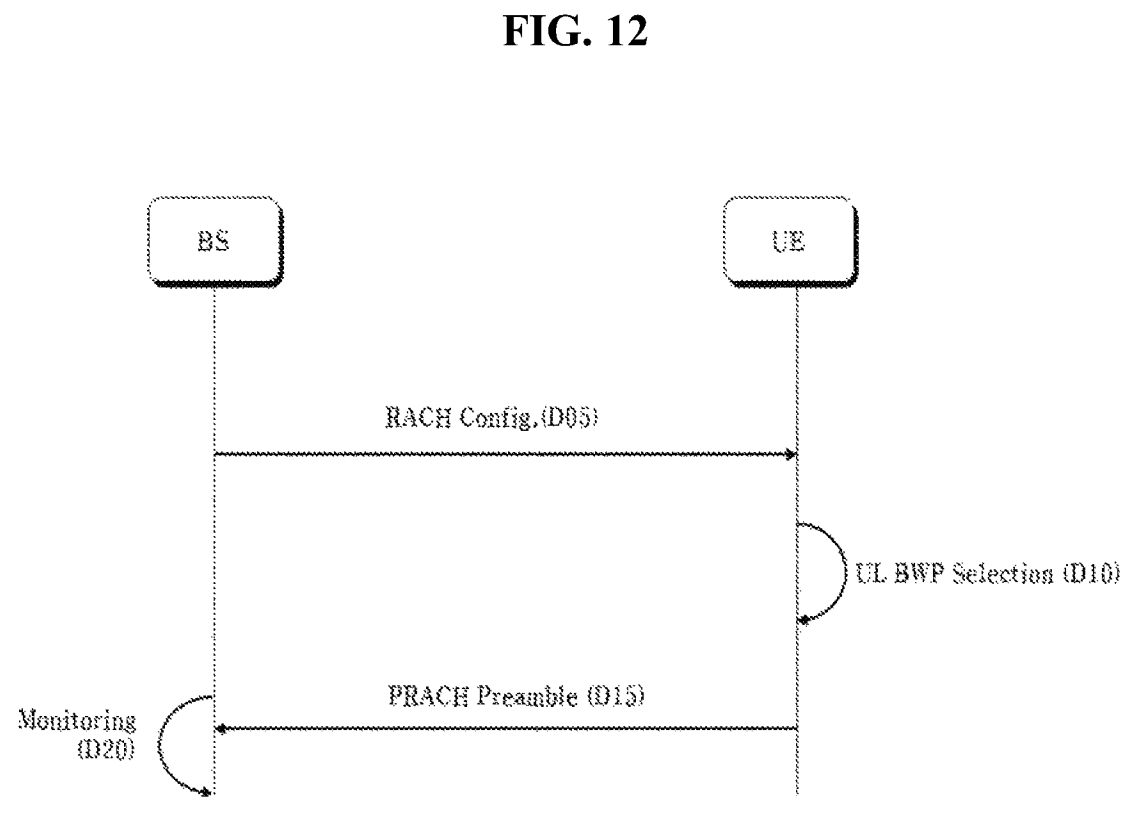

FIG. 12 illustrates an exemplary signal transmission/reception method based on the above-mentioned proposals. FIG. 12 is one of examples to which present disclosure is applicable, and the present disclosure is not limited to the example of FIG. 12. The above-described details may be referred to for illustration of FIG. 12 unless specified otherwise.

ABS may transmit a RACH configuration for at least one of a plurality of UL BWPs (D05), and a UE may obtain the RACH configuration for the at least one of the plurality of UL BWPs. The plurality of UL BWPs may include a first UL BWP related only to a first type of UE with reduced capability to support a smaller bandwidth than a predetermined bandwidth and a second UL BWP related to a second type of UE, which is different from the first type of UE.

The UE may select an initial UL BWP from among the plurality of UL BWPs (D10).

The UE may transmit a random access preamble on the initial UL BWP selected from among the plurality of UL BWPs based on the RACH configuration (D15). The BS may detect the random access preamble in the plurality of UL BWPs based on the RACH configuration (D20).

The UE may be the first type of UE and configured to select the first UL BWP or the second UL BWP as the initial UL BWP depending on whether a predetermined condition is satisfied.

Based on that the predetermined condition is not satisfied even though the UE is the first type of UE, the UE may be configured to select the second UL BWP as the initial UL BWP.

Based on that capability of the UE does not support the second UL BWP, the UE may be configured to determine that the predetermined condition is satisfied and select the first UL BWP as the initial UL BWP.

Based on that capability of the UE supports the second UL BWP even though the UE is the first type of UE, the UE may be configured to determine that the predetermined condition is not satisfied and select the second UL BWP as the initial UL BWP.

Based on that the first UL BWP is available for the UE, the UE may be configured to determine that the predetermined condition is satisfied and select the first UL BWP as the initial UL BWP.

Based on that the first UL BWP is not available for the UE even though the UE is the first type of UE, the UE may be configured to determine that the predetermined condition is not satisfied and select the second UL BWP as the initial BWP.

Based on that the first UL BWP is available for the UE, the UE may be configured to determine that the predetermined condition is satisfied regardless of availability of the second UL BWP and select the first UL BWP as the initial UL BWP.

The UE may be configured determine availability of the first UL BWP based on higher layer information obtained from a network.

The BS may provide the UE with information on the predetermined condition for the first type of UE to select the initial UL BWP. The information on the predetermined condition provided by the BS (e.g., condition for selecting the initial UL BWP) may be a criterion for the first type to select one of the first UL BWP and the second UL BWP as the initial UL BWP.

Figure 13:
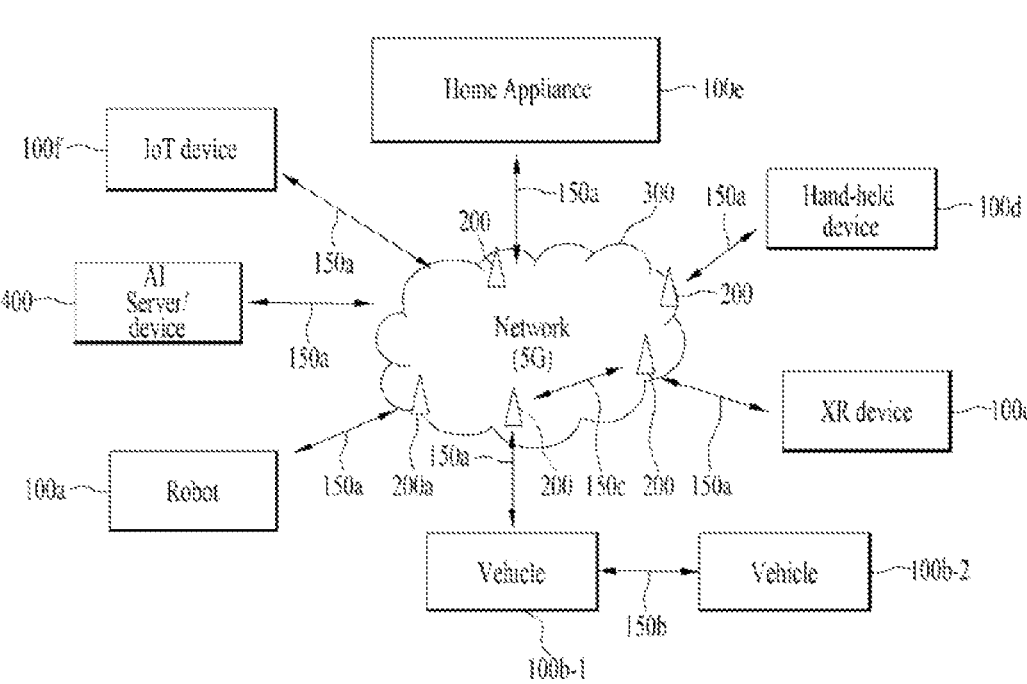
FIGS. 13 and 14 illustrate a communication system 1 and wireless devices applied to the present disclosure.

FIG. 13 illustrates a communication system 1 applied to the present disclosure.

Referring to FIG. 13, a communication system 1 includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BS s/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 14:
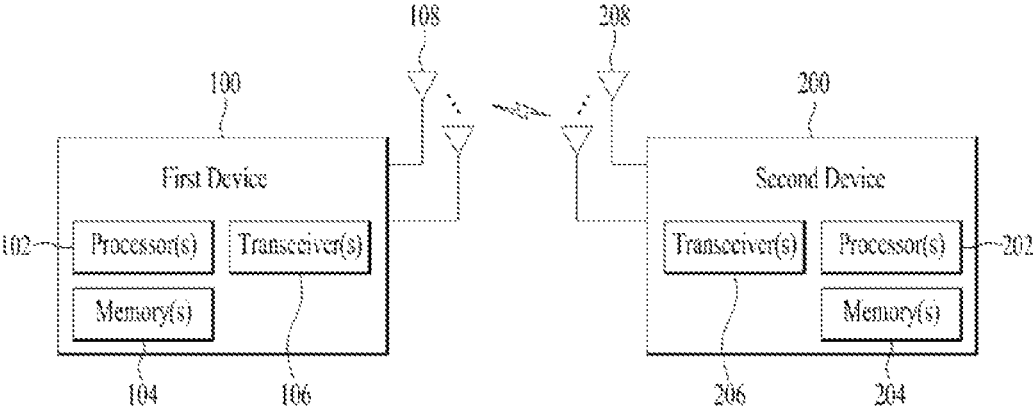

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 15:
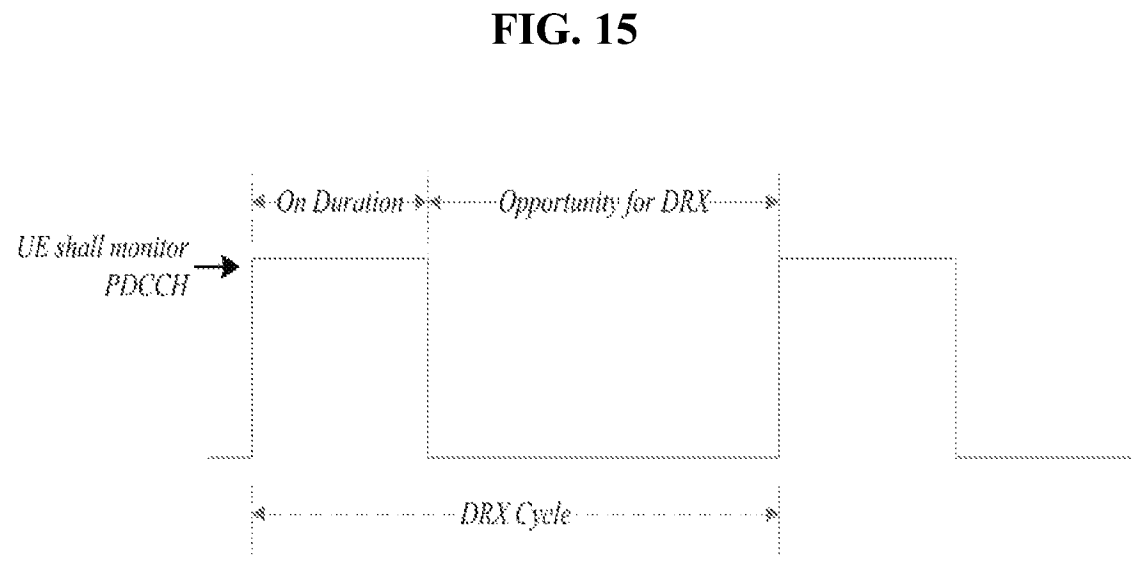

FIG. 15 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

A DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

The above-described embodiments are combinations of elements and features of the present disclosure in specific forms. The elements or features may be considered selective unless mentioned otherwise. Each element or feature may be implemented without being combined with other elements or features. Further, the embodiments of the present disclosure may be configured by combining some elements and/or some features. Operation orders described in the embodiments of the present disclosure may be rearranged. Some constructions or features of any one embodiment may be included in another embodiment or may be replaced with corresponding constructions or features of another embodiment. It is obvious that claims that are not explicitly cited in the appended claims may be presented in combination as an embodiment of the present disclosure or included as a new claim by subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method performed by a reduced capability (RedCap)-user equipment (R-UE), the method comprising:
obtaining (i) information regarding a initial downlink (DL) bandwidth part (BWP), (ii) information regarding a RedCap-dedicated initial DL BWP, (iii) information regarding a normal initial uplink (UL) BWP and (iv) information regarding a RedCap-dedicated initial UL BWP; and
based on the RedCap-dedicated initial UL BWP being configured, performing a random access procedure,
wherein the random access procedure comprises:
transmitting a random access preamble; and
monitoring a physical downlink control channel (PDCCH),
wherein the random access preamble is determined based on a reference signal received signal (RSRP) measurement for a synchronization signal block (SSB) associated with the initial DL BWP,
wherein, after performing the RSRP measurement for the SSB associated with the initial DL BWP, the PDCCH is monitored in a DL BWP determined as the initial DL BWP or the RedCap-dedicated initial DL BWP, and
wherein the DL BWP for monitoring the PDCCH is determined based on whether the random access procedure is performed for requesting system information.

2. The method of claim 1, wherein a first random access channel (RACH) configuration is configured for the RedCap-dedicated initial UL BWP and a second RACH configuration is configured for the initial UL BWP.

3. The method of claim 2, wherein the R-UE transmits the random access preamble based on the first RACH configuration.

4. A non-transitory processor-readable storage medium having stored thereon a program for executing the method of claim 1.

5. A reduced capability (RedCap)-device (R-device) comprising:
a memory configured to store instructions; and
a processor configured to perform operations by executing the instructions,
wherein the operations performed by the processor comprise:
obtaining (i) information regarding a initial downlink (DL) bandwidth part (BWP), (ii) information regarding a RedCap-dedicated initial DL BWP, (iii) information regarding a initial uplink (UL) BWP and (iv) information regarding a RedCap-dedicated initial UL BWP; and
based on the RedCap-dedicated initial UL BWP being configured, performing a random access procedure,
wherein the random access procedure comprises:
transmitting a random access preamble; and
monitoring a physical downlink control channel (PDCCH),
wherein the random access preamble is determined based on a reference signal received signal (RSRP) measurement for a synchronization signal block (SSB) associated with the initial DL BWP, wherein, after performing the RSRP measurement for the SSB associated with the initial DL BWP, the PDCCH is monitored in a DL BWP determined as the initial DL BWP or the RedCap-dedicated initial DL BWP, and wherein the DL BWP for monitoring the PDCCH is determined based on whether the random access procedure is performed for requesting system information.

6. The R-device of claim 5, further comprising a transceiver configured to transmit and receive a radio signal under control of the processor, wherein the R-device is a reduced capability-user equipment (R-UE).

7. The R-device of claim 5, wherein the R-device is an application-specific integrated circuit (ASIC) or a digital signal processing device.

\* \* \* \* \*